United States Patent Office 2,847,132
Patented Aug. 12, 1958

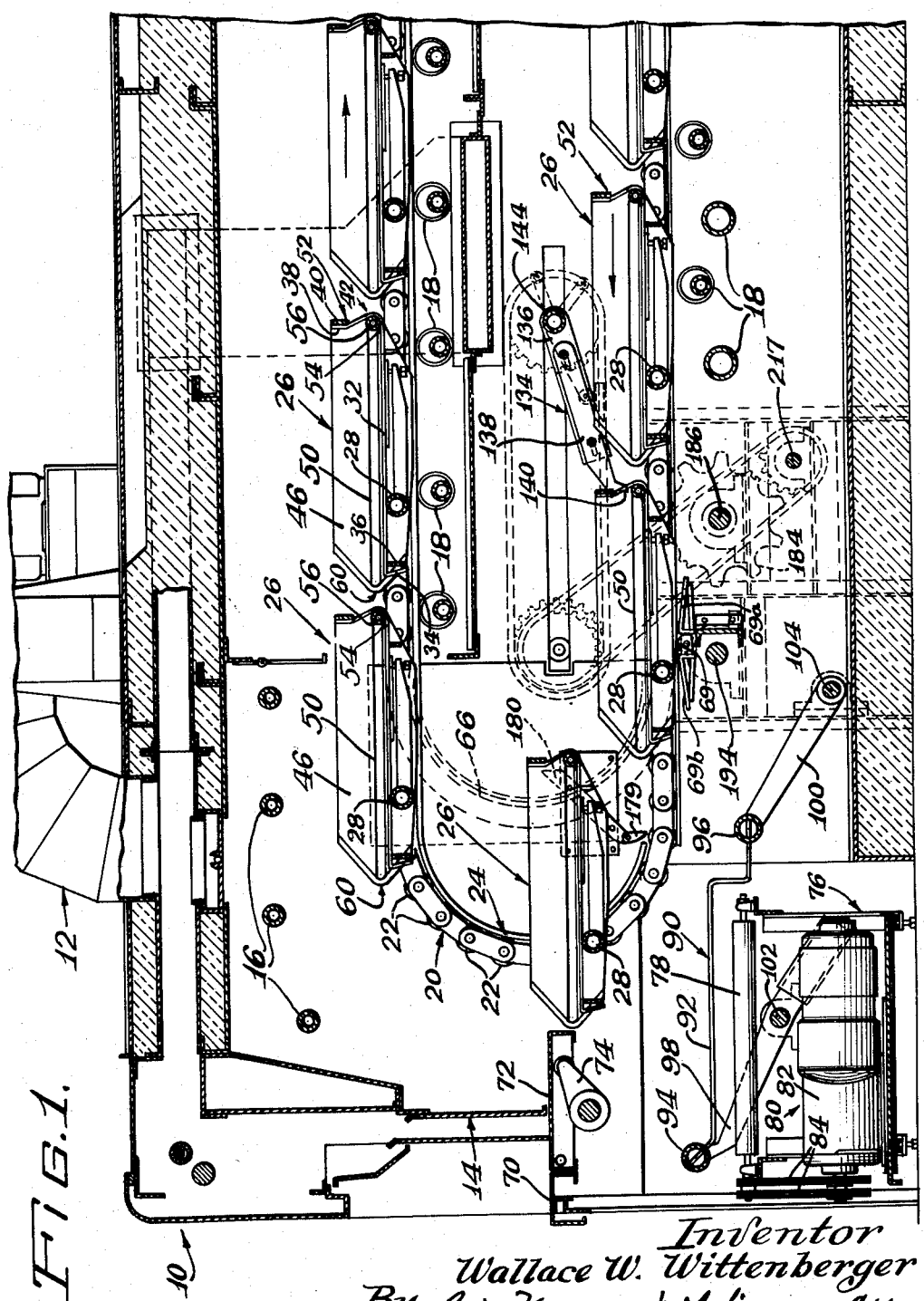

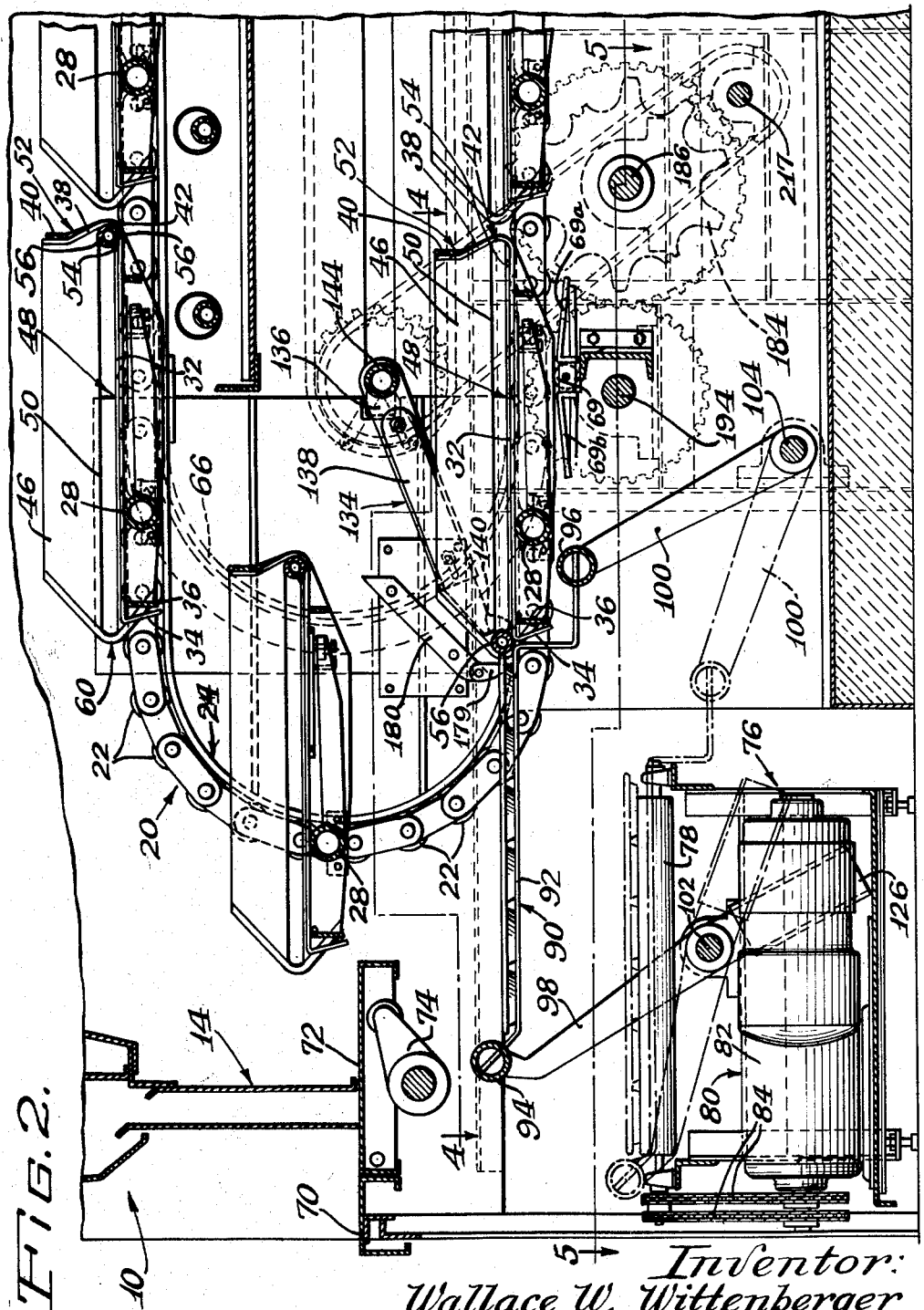

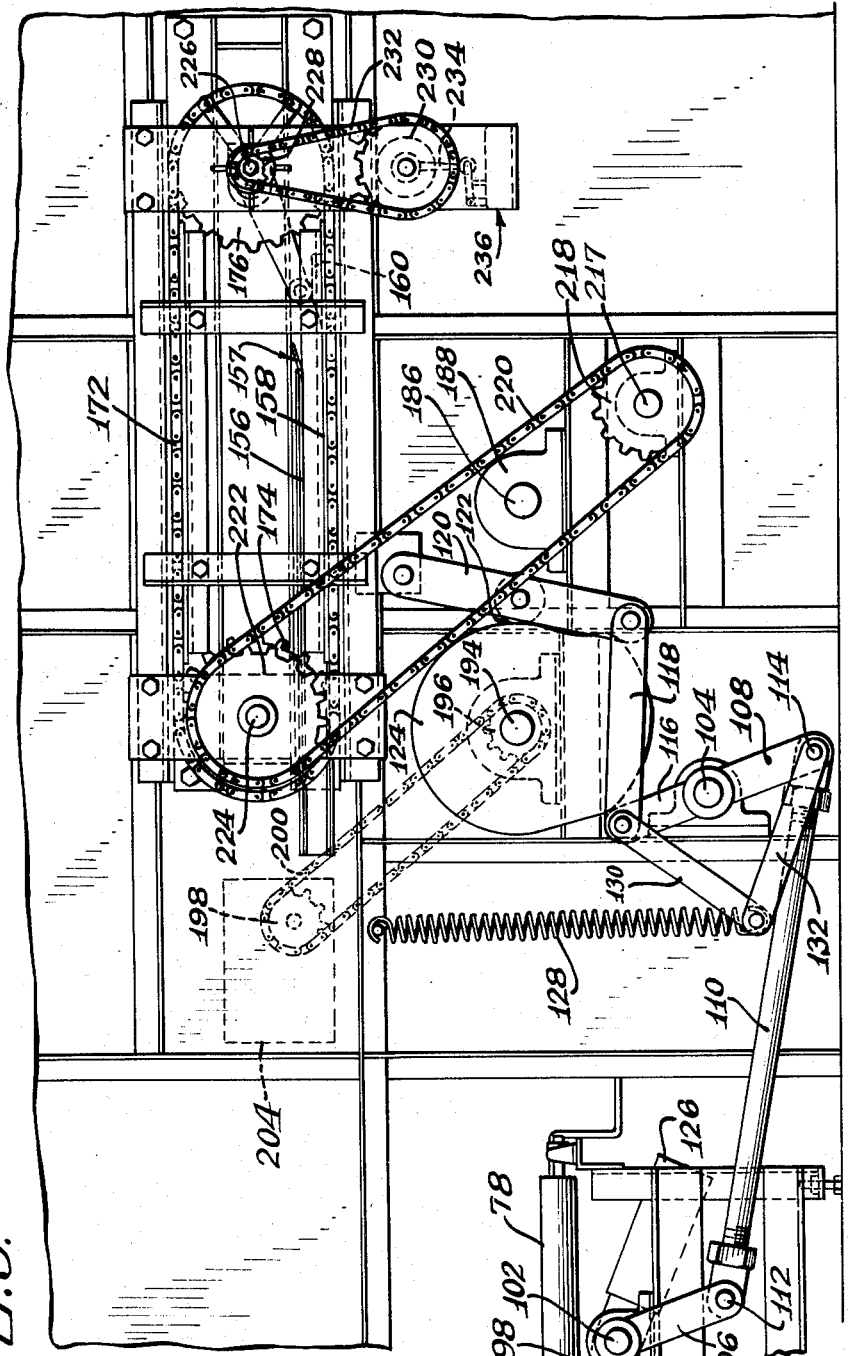

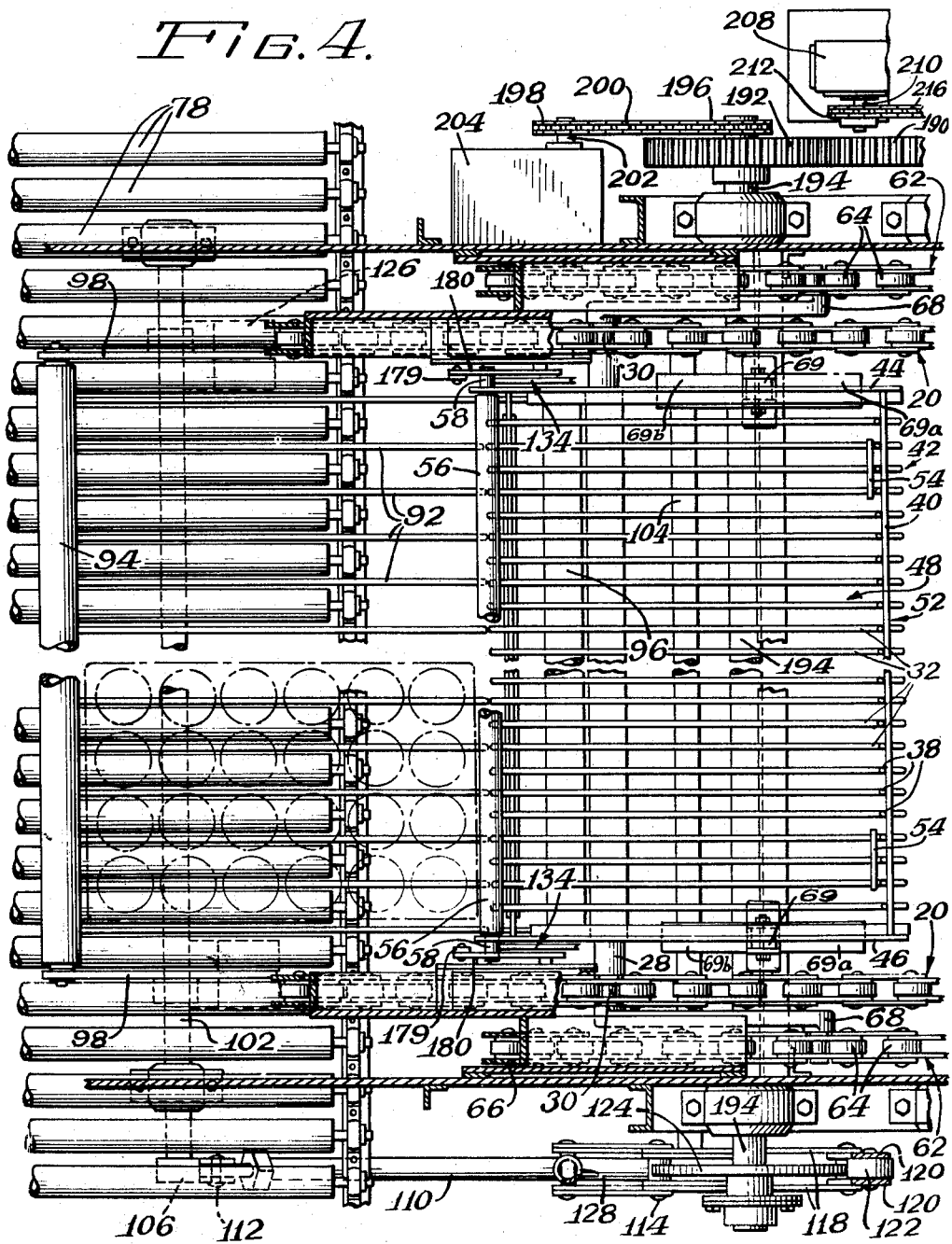

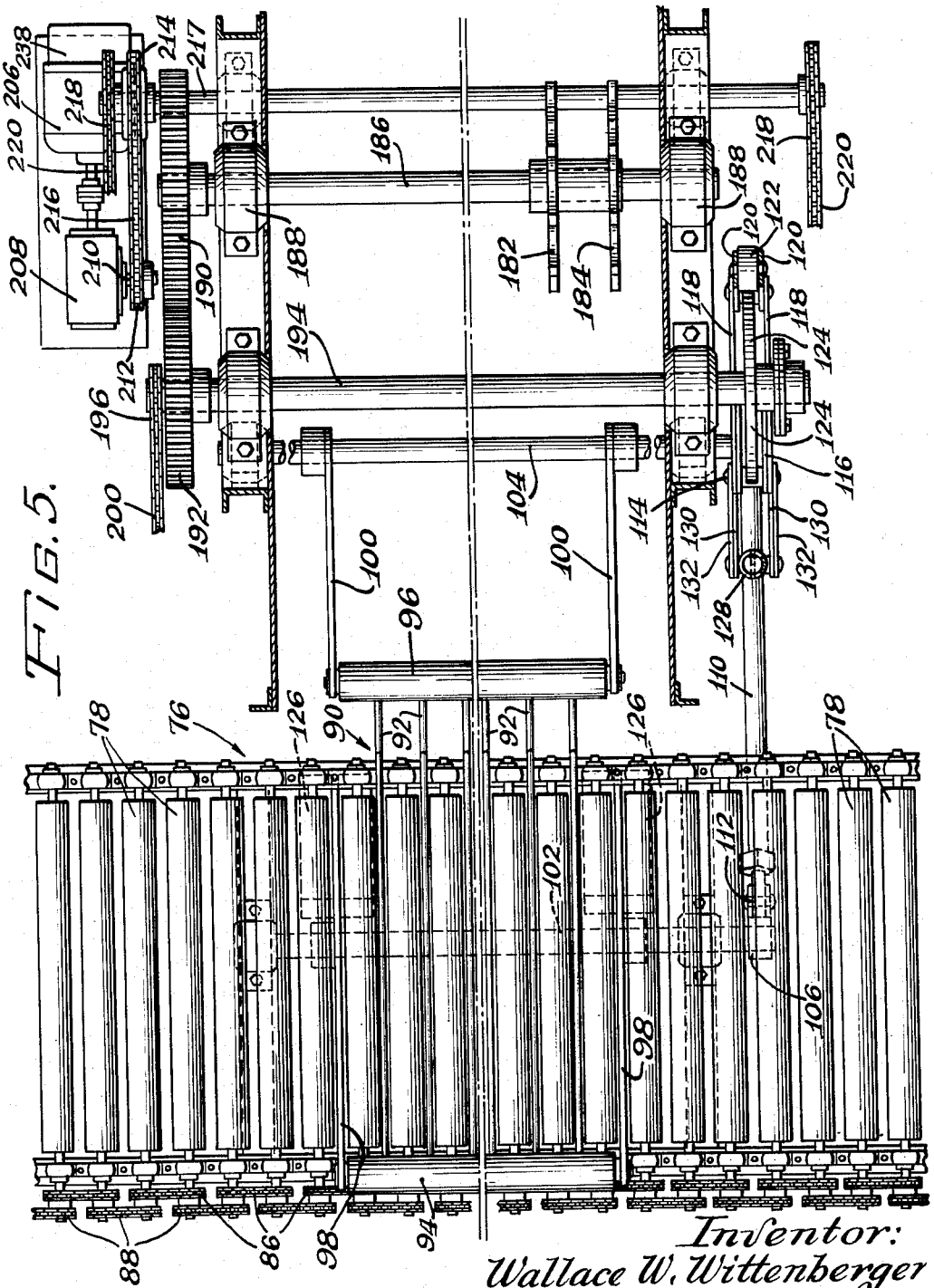

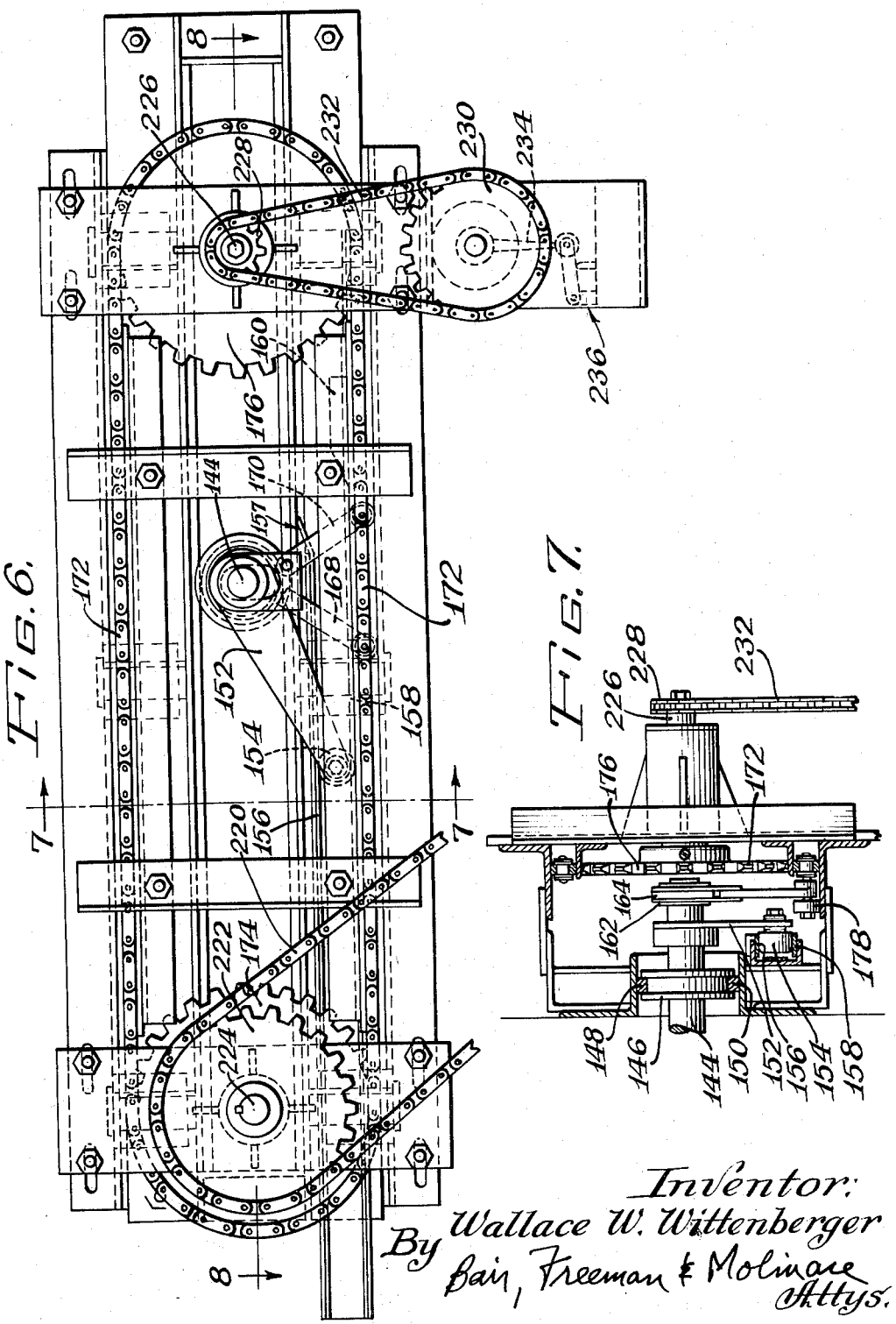

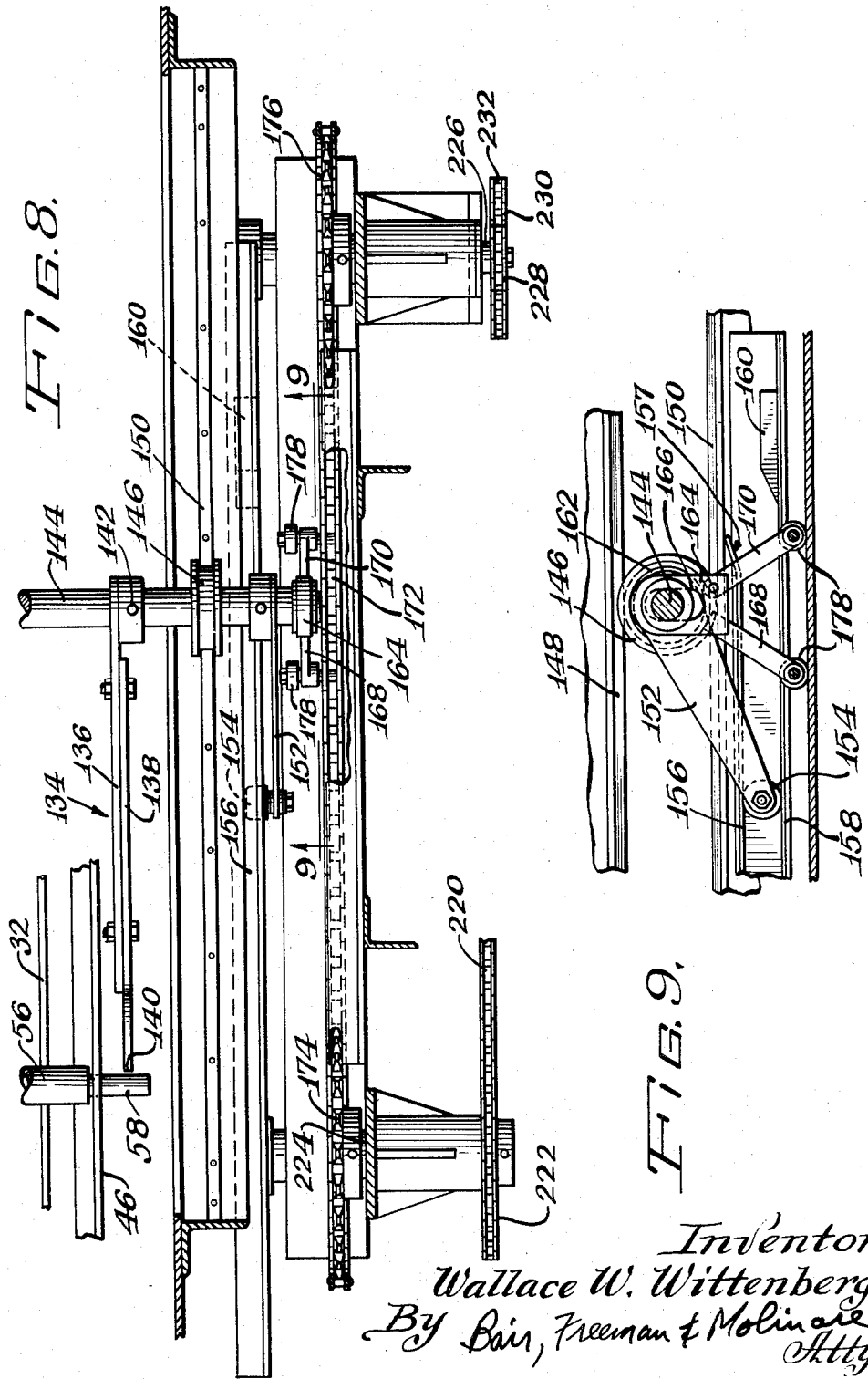

2,847,132

POSITIVE PUSH-OFF OVEN UNLOADER

Wallace W. Wittenberger, Elmhurst, Ill., assignor to The Petersen Oven Company, Franklin Park, Ill., a corporation of Illinois Application August 22, 1955, Serial No. 529,688

17 Claims. (Cl. 214—18)

This invention relates to a baking oven and more particularly to a system of conveyors for moving goods through the baking oven.

Automatic baking ovens using conveyor systems, which move through the oven carrying goods through said oven for a predetermined period of time, are well known in the art. However, the unloading of finished goods from the oven conveyors has posed a number of problems that have heretofore defied adequate solution therefor.

Two systems have been used heretofore for unloading finished goods from the oven conveyor. The first system utilizes force-of-gravity to effect discharge of finished goods, and includes a tilting goods-tray which is tilted at the discharge station to permit gravity to move the bakery-goods baking containers, such as pan straps, to slide off the trays onto a discharge platform or discharge conveyor. One trouble with this first system lies in the fact that such discharge is not satisfactory for delicate goods, or for goods having flowable or soupy fillings, such as open top pies, and spoiled goods often result. With this first type of system, the unloading of soupy products and delicate goods, such as cakes, pies, and buns, is still performed by hand which requires a time delay in the operation of the baking oven. Another trouble arises when the gravity discharged containers, such as pan straps are discharged onto a laterally moving discharge conveyor, at which time one pan strap might slide faster than an adjacent pan strap and slip onto the discharge conveyor before said second pan strap and cause a jam-up of the pan straps discharging onto the discharge conveyor. Such jam-ups might require shutdown of the conveyor system, and any shut down of the conveyor system may result in spoilage, by overcooking, of the goods then being carried by the oven conveyor. Also, the striking of pan straps against each other may result in damage to said pan straps.

Still another difficulty arising from use of said first system lies in the fact that unloading of pan straps for buns poses a particular problem. Buns are baked in pan straps of relatively very shallow depth. If the pan straps for buns are discharged from the tray by gravity, the buns have a tendency to become dislodged from the cavities of the pan strap. It is very important that the buns be properly maintained in the cavity of the pan strap, since it is often desired to slice the buns down the middle thereof by means of rotating saws, or the like, and such slicing cannot be properly performed if the buns are dislodged from their cavities in the pan strap.

Still another objection to the gravity type discharge is that it is very noisy, as the pan straps crash noisily against each other as they are discharged.

The second system for discharging goods from an oven conveyor utilizes an intermittently moving oven conveyor and a synchronized claw means, or rake-type means, or the like, which enters the goods-tray while the oven conveyor is at rest and attempts to pull off, horizontally, all the pan straps from the tray that is being unloaded, onto a discharge conveyor therefor. One problem raised by this second system is the requirement of an intermittently moving oven conveyor and problems attendant with such a system. A second problem arises in that the claw, or rake-type, discharge means may fail to reach inwardly or downwardly far enough relative to the tray being unloaded and, therefore, sometimes fails to effect the discharge of pan straps of very low height, which are used for baking thin buns and the like, or fails to effect discharge of pan straps which are located innermost on the tray.

The rake-type tray unloaders also usually require the pan straps to drop some distance below the plane of the tray bottom as the pan straps are unloaded to the next station. This dropping of the pan straps may cause damage to foodstuffs and also dislodgement of products from the cavities of the pan straps. The rake-type unloader cannot be used for unloading pies or other delicate bakery goods.

The rake-type unloader may fail to operate properly when the trays are deformed, as by warping, and sometimes became caught in the reticulated trays and thus caused jamming of the mechanism and damage both to the trays and to the rake-type unloader, and such jam-ups may cause shutdown of the baking oven for many hours or as long as a full day. The use of the rake-type unloader poses problems because of the difficulty of correlating the lowermost edge of the rake and the bottom of the tray.

Accordingly, it is an object of this invention to provide a novel conveyor system for moving goods through a baking oven, and a discharge means therefor, which obviates the aforementioned difficulties attendant with use of other systems and which is operative to discharge finished goods horizontally from the trays of a constantly moving conveyor.

Another object of this invention is to provide a positive push-off type unloading system for oven conveyors which insures that all pan straps of finished goods, regardless of the height of the pan strap, or of the positioning of the pan straps on the trays therefor, are discharged from the conveyor tray being unloaded.

A further object of this invention is to provide a novel tray for oven conveyors which includes means thereon adapted to provide for positive push-off of finished goods from said tray.

Still another object of this invention is to provide a novel positive push-off unloading system which may be used either with constantly moving or intermittently moving oven conveyors.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a vertical cross-section view through a portion of a baking oven which includes the novel conveyor system of this invention and illustrates the relationship of the oven conveyor, the transfer platform, and the discharge conveyor;

Figure 2 is an enlarged view of a portion of the apparatus shown in Figure 1 and shows in full lines the transfer platform in alignment with the bottom of a tray which is having the pan straps thereon being discharged therefrom, and also shows in dot-dash lines the position of the transfer platform when the pan straps are transferred from the transfer platform to the discharge conveyor;

Figure 3 is an enlarged side elevation view showing particular parts of the operating mechanism and particularly showing the cam means for controlling the movement of the transfer platform, and showing the drive means which control the actuation of the positive push-off mechanism for the conveyor trays;

Figure 4 is a plan view taken substantially on line 4—4 of Figure 2, with a section of the machine between the lateral ends thereof omitted;

Figure 5 is a plan view taken on line 5—5 of Figure 2, with a central portion of the machine omitted as in Figure 4;

Figure 6 is an enlarged side elevation view of the drive mechanism for the positive push-off actuating means which is shown in Figure 3;

Figure 7 is a cross-section view taken on line 7—7 of Figure 6;

Figure 8 is a view, partly in plan and partly in cross-section, taken on line 8—8 of Figure 6; and Figure 9 is an elevational detail view taken on line 9—9 of Figure 8.

Referring now to the drawings there is shown in Figures 1 and 2 a baking oven generally indicated at 10, portions of which are readily recognized as vent means, generally indicated at 12, an entrance door 14, steam pipes 16, and heating system pipes 18.

Within the oven is a first conveyor means, or oven conveyor, which may be constructed to include therein the teachings of U. S. Patent No. 2,242,813. The oven conveyor is arranged to move over a closed continuous path, only a portion of which is shown in the drawings. The oven conveyor means includes a first pair of spaced endless chains 20 which include rollers 22 at the pivot points of the chain links, and with said rollers being trained over track means, generally indicated at 24, which cause said endless chains 20 to follow a predetermined path. The drive means for said endless chains 20 may include drive sprockets, or the like, which are not shown, over which said endless chains are trained.

The oven conveyor carries thereon a plurality of trays generally indicated at 26. The connection between the endless chains 20 and tray 26 includes the elongated tubular member 28 whose ends are reduced at 30, as best seen in Figure 4, for pivotal connection to links of chains 20 between adjacent rollers 22. Each tray is formed of a plurality of spaced parallel bars, or rods, 32 which lie parallel to the endless chains 20, and which bars 32 are rigidly interconnected by transverse members.

One end of said parallel bars 32 are bent downward at 34 and appropriately secured to transverse structural member 36. The other end of parallel bars 32 are bent upwardly at 38 and rigidly interconnected by transverse structural member 40. The bend in bars 32 adjacent the ends 38 is such as to define a slight bulge, or curve, as indicated at 42, adjacent the end of the tray 26.

Each tray 26 is provided with lateral sides 44 and 46, which are appropriately secured to the transverse structural members 36 and 40. The support surface, or bottom 48 of tray 26 is defined by the horizontal portions of the spaced parallel bars 32. The tray sides 44 and 46 are apertured to define elongated slots 50 therein located above said tray bottom 48.

The under structure of the tray 32, below tray bottom 48, is provided with screw means for adjusting the level of said bottom 48 so as to provide a means for aligning said bottom 48 relative to the chains 20.

The arrangement of parts of the tray 26 above described is such that considering tray 26 as it moves along the bottom run of continuous chains 20, from right to left in Figures 1 and 2, said tray has a leading end at the left and a trailing end at the right. The leading end of tray 26 is unobstructed above tray bottom 48, and there are upright barrier means, generally indicated at 52, extending above the tray bottom 48 at the trailing end of tray 26.

Still referring to tray 26, said tray bottom 48 has mounted thereon, on the upper side thereof, a ledge means, in the form of bars 54 which lie parallel to the trailing end of tray 26 and are slightly spaced from said trailing end toward said leading end of tray 26. Said ledge bars 54 and spaced upright barrier means 52, together with said bulge 42, cooperate to define an elongated channel. Each tray 26 carries thereon a discharging member in the form of an elongated roller 56 which is normally positioned in said channel defined between ledge bars 54 and barrier means 52. Said discharge roller 56 extends substantially the entire width of said tray 26 and has reduced ends 58 extending beyond the lateral edges of said tray 26 through said elongated slots 50. The slots 50 are of greater width than the dimension of reduced ends 58 to provide for vertical movement of roller 56 as it passes over ledge bars 54. The edges of lateral sides 44 and 46 of tray 26, adjacent the leading end of tray 26, are continuous and uninterrupted, as indicated at 60, and serve to close off the leading end of elongated slots 50 to provide a stop for limiting forward movement of roller 56 within slots 50.

The first conveyor means, or oven conveyor means, includes a second pair of spaced endless chains 62 which are parallel to and offset, as shown, from said first endless chains 20. Chains 62 are constructed similarly to chains 20, are similarly driven, and similarly include rollers 64 caused to pass over track means 66. This second pair of endless chains 62 are for stabilizing the trays 26 by means of stabilizer arms 68 which interconnect chains 62 and trays 26 in a similar manner and for the purpose as more fully described in U. S. Patent No. 2,242,813.

The arrangement of trays 26 and first conveyor means including endless chains 20 and 62 is operative to translate the trays 26 through the oven over an endless path, said trays being maintained at all times with their bottoms 48 maintained substantially horizontal but with a very, very slight pitch back.

In order to insure that the bottom 48 of tray 26 is perfectly horizontal, at the point where goods are to be discharged from the tray 26, there are provided a pair of leveling rollers 69, adjacent opposite lateral sides of tray 26, which the under structure of tray 26 is adapted to engage as said tray 26 passes thereover. The leveling rollers operate to lift the trays 26 from their very slight pitch back condition just enough to level the bottom 48 perfectly, from front to rear. Ramps 69a and 69b are provided adjacent the approach and leave of each roller 69 to provide for smooth passage of tray 26 over said leveling rollers 69.

There is provided a loading station, or region, adjacent a portion of the path along which the trays 26 are moved by said oven conveyor means. Said loading station includes a fixed loading platform 70 on the oven structure, and a vertically movable loading platform 72 which extends inwardly of oven door 14 into the oven. Means including pivotable arm 74 are provided for moving said movable loading platform upwardly in synchronism with a tray 26 so as to provide for proper loading, of goods to be baked, onto the trays 26 as they pass the loading station. After one tray is loaded the platform 72 is dropped down to its normal position to await arrival of the next tray to be loaded. The means for synchronizing movement of platform 72 with movement of trays 26 is not shown as it forms no part of this invention.

There is provided, adjacent a portion of the path along which trays 26 are moved by said oven conveyor means, a discharge station, or region, at which finished goods are discharged from the trays prior to the trays moving into said tray loading region. Finished goods that are discharged from the trays 26 are transferred to a second, or discharge, conveyor means, which conveys the finished goods out from the oven.

The discharge conveyor means are best seen in Figures 1, 2, 4, and 5. Said discharge means comprises a frame support generally indicated at 76, a plurality of spaced parallel rollers 78 journaled in said frame, the upper reaches of said rollers being disposed in a substantially horizontal plane, and a drive means, generally indicated at 80, for said rollers. The drive means 80 includes a gear reduced drive motor 82 which drives a pair of drive chains 84 which are trained over sprockets carried by two of said rollers 78. As best seen in Figure 5, each adjacent pair of drive rollers 78 is drivingly interconnected by drive chains 86 and 88 thereby providing for transmission of power to all the rollers 78 of said discharge conveyor means. The discharge conveyor is spaced laterally of and below the discharge region where finished goods are discharged from said oven conveyor.

The means for transferring discharged goods from the first, or oven, conveyor means to the second, or discharge, conveyor means includes a substantially horizontally disposed goods-receiving means, or goods-receiving platform, 90. Said platform 90 is formed by a grill work of parallel bars or rods 92 which lie parallel to the bars defining the bottoms 48 of trays 26, as seen in Figure 4.

The rods 92 defining the platform 90 are rigidly secured at their ends to a pair of parallel transverse structural tubes 94 and 96. Said tubes 94 and 96 are, in turn, pivotally mounted on pairs of pivot arms 98 and 100, which, in turn, are mounted for swinging movement on horizontal and parallel rock shafts 102 and 104. Said rock shafts 102 and 104 are appropriately journaled on suitable rigid framework.

The above described arrangement of parallel rock shafts 102 and 104, pivot arms 98 and 100, and parallel tubes 94 and 96, define a parallelogram linkage by means of which said platform 90 is maintained horizontal as it is swung between its extreme positions, the uppermost one of which is shown in full lines in Figure 2 and the lowermost one being shown in dot-dash lines in said Figure 2.

In its uppermost position the horizontal platform 90 is aligned with the horizontal bottom 48 of the tray whose finished goods are being discharged by means hereinafter described.

The bars 92 of the platform 90 are so arranged relative to the spaced rollers 78 of the discharge conveyor means that when the platform 90 is in its lowermost position, shown in dot-dash lines in Figure 2, then the bars 92 of platform 90 are disposed in the spaces between the rollers 78 and are located below the uppermost reaches of the rollers 78 of said discharge conveyor. As platform 90 carrying finished goods moves, from the full line position in Figure 2 to the dot-dash line position of Figure 2, there is effected a transfer of the finished goods from the horizontal platform 90 to the horizontal discharge conveyor, whereupon the speed of said discharge conveyor is operative to clear the finished goods from above platform 90 before it is necessary to begin return of platform toward the full line position of Figure 2. As shown, the bars 92 are appropriately shaped to provide for clearance of all possible interfering parts.

The actuating means for effecting raising and lowering of said goods-receiving means, or platform, 90 includes a parallelogram linkage of sufficient strength to transmit the various forces imposed thereon. Said parallelogram linkage includes parallel arms 106 and 108 which are secured respectively to parallel rock shafts 102 and 104. An elongated transverse bar 110 is pivotally connected to arms 106 and 108 at pivot points 112 and 114 which lie in a plane parallel to a plane through the axes of rock shafts 102 and 104. Transverse bar 110 is provided with threaded adjustment means, as shown, to accommodate any adjustment of distances required.

Said actuating means for platform 90 further includes arm 116 secured to rock shaft 104, link 118 pivotally attached to arm 116, and link 120 pivotally attached at one end to link 118 and at its other end to rigid framework. Link 120 carries a cam follower roller 122 which rides over the edge of cam 124, thereby providing for movement of platform 90 through movement of linkage 120—118—116 and through parallelogram linkage 108—110—106.

Means for counterbalancing the weights of the various parts of the parallelogram linkages and of the platform 90 are provided by counterweights 126 attached to pivot arms 98, and by the tension spring 128 connected at one end to rigid framework and at its other end to a lever arm defined by links 130 and 132, which are appropriately pivotally secured to arms 116 and 108.

A discharge means for discharging finished goods from the trays 26, while the trays are moving, is provided. As was described above, each tray 26 carries therein, adjacent the trailing end thereof, a discharge roller 56. When the discharge roller is caused to move across the tray bottom 48 from the trailing end to the leading end thereof, said roller 56 is operative to sweep off all of the pan straps of goods carried on said tray bottom 48.

The means for actuating the discharge roller 48, and the drive means therefor, will now be described. Said discharge roller actuating means includes a pair of arms, generally indicated at 134, which are telescopically adjustable and which are positioned to engage the reduced ends 58 of roller 56. As best seen in Figures 2 and 8, the arms 134 are formed of telescoping members 136 and 138 provided with slotted hole and bolt connections to permit of fine adjustment.

Member 138 carries an enlarged concaved flange 140 at the extended end thereof adapted to provide for adequate engagement with reduced end 58 of roller 56. Member 136 is adjustably secured by set screw 142, or the like, to shaft 144. Shaft 144 is carried by rollers 146 which are arranged to ride between upper and lower track members 148 and 150 which are carried on rigid framework. Shaft 144 extends outwardly beyond the rollers 146 and has secured thereon actuating arms 152. Actuating arms 152 carry, at their extended ends, a roller 154 which is positioned between upper and lower tracks 156 and 158.

The lower track 158 carries thereon, adjacent one end thereof, a cam 160 which roller 154 is adapted to ride up on. Upper track 156 is appropriately turned up and terminated, as indicated at 157, adjacent cam 160 to provide for smooth action in having roller 154 ride up cam 160, and to obviate any jamming. When roller 154 rides up cam 160 it pivots shaft 144 about its pivot axis and causes the extended end 140 of extensible arm 134 to be raised a height sufficient to permit the reduced end 58 of a roller 56 to pass thereunder.

The shaft 144 carries at the outer ends thereof a flanged pulley 162. Carried in the groove of pulley 162 is a connecting plate 164 having an elongated slot 166 therein. The minimum dimension of slot 166 is less than the dimension of the flanges of pulley 162 thereby insuring that plate 164 will not slip off pulley 162. Connecting plate 164 carries a pair of links 168 and 170 which, in turn, are connected to an endless chain 172. The endless chain 172 is trained over a pair of spaced sprockets 174 and 176. The elongated slot 166 in plate 164 provides accommodation to permit of the links 168 and 170 passing with chain 172 around sprockets 174 and 176 and along both the upper and lower runs of chain 172. The links 168 and 170 are additionally supported by rollers 178 which pass over track means defined in the rigid framework.

As the links 168 and 170 pass along the lower run of chain 172 from right to left, when looking at Figures 2 and 6, the roller 154 rides down cam 160 and flanges 140 are moved into operative position behind the reduced ends 58 of a roller 56. The movement of chain 172 is faster than movement of chain 20 and hence flanges 140 engage roller 56 and force said roller 56 over ledge means 54 and across tray bottom 48 to the leading end of tray 26. At this point links 168 and 170 are at the end of their forward run along chain 172 and begin their backward run causing extensible arms 134 to disengage roller 56. The shaft 144 and extensible arms 134 are then caused to move from left to right as viewed in Figure 6. The timing is such that roller 154 is caused to ride up cam 160 before the next roller 56 is moved into position for engagement thereby with said extensible arms 134.

After the extensible arms disengage from roller 56, further movement of chains 20 will bring the reduced ends 55 of roller 56 into engagement with a depending end 179 of a stationary cam means, and still further movement of the tray 26 along with chain 20 will cause engagement of ends 58 of roller 56 with fixed sloped cams 180 which terminates at their upper ends at a point where they have been operative to restore roller 56 back to its normal position on tray 26 in the channel formed between ledge means 54 and upright barrier 52, whereupon the tray 26 is conditioned for another cycle through the oven and through the discharge region. The restoring of roller 56 to its normal position, so as to condition tray 26 for another cycle, occurs just before or as they tray 26 enters the loading region.

The speed of the actuating means for discharge roller 56 is so selected that an entire cycle of movement of said means occurs more rapidly than it takes to advance the next tray to the point where the discharge cycle should start. This means that said actuating means must go through a period of dwell until the right time is reached for the cycle to be initiated. In the description that follows it will be seen how such requirements are met by the synchronizing means of this machine.

The movement of the oven conveyor chains 20 and 62 is caused to directly control the actuating means for the platform 90. Sprockets 182 and 184, carried on a shaft 186 journaled in bearings 188 on the framework, are positioned to be actuated by said conveyor chain means. Shaft 186 carries a gear 190 which drives a gear 192 on a drive shaft 194 that is appropriately journaled on the framework. Shaft 194 carries and rotates cam 124 which actuates the means for raising and lowering platform 90.

Drive shaft 194 carries a sprocket 196 which drives another sprocket 198 through chain 200. The output of sprocket 198 is transmitted through shaft 202 to the interior of a control box 204 wherein appropriate gearing (not shown) determines when a tray 26 is appropriately positioned for discharge of goods therefrom. The mechanism in control box 204 controls the start of a motor 206 whose output goes through gear reducer 208 to shaft 210 carrying a sprocket 212 which drives sprocket 214 through chain 216. Sprocket 214 is carried by shaft 217 which also carries a pair of sprockets 218.

Sprockets 218 transmit drive through chains 220 to sprockets 222 which are mounted on stub shafts 224. Stub shafts 224 carry sprockets 174 over which said chain 172 is trained.

The above description is of the starting means and drive means of the actuating means for the discharge roller 56. It is also necessary to provide means for stopping said actuating means. Sprockets 176, over which chains 172 are trained, are mounted on stub shafts 226 which carry small sprockets 228. Each sprocket 228 drives a sprocket 230 through a chain 232, and said sprocket 230 causes a cam, or finger, 234 to actuate a switch 236 after said sprocket 228 has made a predetermined number of turns. The switch 236 operates to shut off motor 206 which is provided with a motor brake 238 for fast stopping.

In the machine hereinabove described the movement of the platform 72 is synchronized with the movement of the oven conveyor means and with movement of the actuating means for the discharge roller 56 so that goods discharged from tray 26, while tray 26 is moving, are discharged horizontally onto said platform 12 which is aligned with the bottom 48 of tray 26. This operation results in the provision of a conveyor and discharge system which is operatively to obviate the above set forth difficulties attendant with discharge systems heretofore employed.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A conveyor system for moving goods through a baking oven comprising, in combination, a first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms horizontal; a loading station adjacent a portion of the path of said first conveyor means; a discharge station adjacent a portion of the path of said first conveyor means located before said loading station; a second conveyor means for carrying away goods that are discharged from said first conveyor means; a substantially horizontally disposed goods-receiving means adapted to receive goods discharged horizontally from said trays and to transfer the discharged goods therefrom to said second conveyor means; actuating means for moving said goods-receiving means between a position in horizontal alignment with the goods carrying bottoms of the trays, for receiving goods from said trays, to a position where the goods are transferred from said goods-receiving means to said second conveyor means; discharge means for discharging the goods carried by said trays, while the trays are moving, in a direction parallel to the direction of movement of the said trays, and means synchronizing the movement of said goods-receiving means with the movement of said first conveyor means and with the movement of said discharge means.

2. A conveyor system for moving goods through a baking oven comprising, in combination, a constantly moving first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms horizontal; a second conveyor means for carrying away goods that are discharged from said first conveyor means; a substantially horizontally disposed goods-receiving means adapted to receive goods discharged horizontally from said trays and to transfer the discharged goods therefrom to said second conveyor means; actuating means for moving said goods-receiving means between a position for receiving goods from said trays to a position where the goods are transferred from said goods-receiving means to said second conveyor means; discharge means for horizontally discharging the goods carried by said trays, while the trays are moving, in a direction parallel to the direction of movement of the said trays; and means synchronizing the movement of said goods-receiving means with the movement of said first conveyor means and with the movement of said discharge means.

3. A conveyor system for moving goods through a baking oven, comprising, in combination, a first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms horizontal; there being a region along the path of said first conveyor means at which goods are discharged from said first conveyor means; a second conveyor means for carrying away goods that are discharged from said first conveyor means; said second conveyor means being spaced laterally from said discharge region along the path of said first conveyor means, and said second conveyor means being located at a lower level than said discharge region; a substantially horizontally disposed platform means adapted to receive goods discharged horizontally from said trays and to transfer goods therefrom to said second conveyor means; actuating means for moving said platform between a position for receiving goods discharged horizontally from said trays to a position where the goods are transferred from said platform to said second conveyor means; discharge means for discharging the goods carried by said trays, while the trays are moving, in a direction parallel to the direction of movement of said trays; and means synchronizing the movement of said platform means with the movement of said first conveyor and with the movement of said discharge means.

4. A conveyor system for moving goods through a baking oven comprising, in combination, a first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms horizontal; a second conveyor means for carrying away goods that are discharged from said first conveyor means; a substantially horizontally disposed goods-receiving means adapted to receive goods discharged horizontally from said trays and to transfer the discharged goods therefrom to said second conveyor means; said goods-receiving means comprising a plurality of parallel rods arranged to define a substantially horizontal goods-receiving platform, said platform being adapted to be aligned with the bottoms of the trays to receive the goods from the trays as said goods are discharged horizontally from said trays; actuating means for moving said goods-receiving means between a position for receiving goods discharged from said trays to a position where the goods are transferred from said goods-receiving means to said second conveyor means; discharge means for discharging the goods carried by said trays, while the trays are moving, in a direction parallel to the direction of movement of the said trays, and means synchronizing the movement of said goods-receiving means with the movement of said first conveyor means and with the movement of said discharge means.

5. A conveyor system for moving goods through a baking oven comprising, in combination, a first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms horizontal; a second conveyor means for carrying away goods that are discharged from said first conveyor means; a substantially horizontally disposed goods-receiving means adapted to receive goods discharged from said trays and to transfer the discharged goods therefrom to said second conveyor means; said goods-receiving means comprising a plurality of parallel rods arranged to define a substantially horizontal goods-receiving platform, said platform being adapted to be aligned with the bottoms of the trays to receive the goods from the trays as said goods are discharged horizontally from said trays, and said second conveyor means comprising a plurality of parallel spaced rollers, said second conveyor means and said goods-receiving platform being arranged so that, when the goods-receiving platform is in position for transferring goods therefrom to said second conveyor, the plurality of parallel rods defining said platform are disposed in spaces located between parallel spaced rollers of said second conveyor and below the uppermost reaches of the adjacent rollers of said second conveyor means; actuating means for moving said goods-receiving means between a position for receiving goods discharged from said trays to a position where the goods are transferred from said goods-receiving means to said second conveyor means; discharge means for discharging the goods carried by said trays, while the trays are moving, in a direction parallel to the direction of movement of the said trays, and means synchronizing the movement of said goods-receiving means with the movement of said first conveyor means and with the movement of said discharge means.

6. A conveyor system for moving goods through a baking oven comprising, in combination, a first conveyor means within the oven arranged to move over a closed continuous path, there being a discharge region along said path at which goods are discharged from said conveyor means; a plurality of trays having substantially horizontally disposed bottoms, for carrying goods thereon, moved by said first conveyor means along said closed continuous path in a manner to constantly maintain said tray bottoms horizontal, said trays having leading and trailing ends as related to the direction of movement of said trays as they approach said discharge region; a second conveyor means for carrying away goods that are discharged from said first conveyor means; a substantially horizontally disposed goods-receiving means adapted to receive goods discharged from said trays and to transfer the discharged goods therefrom to said second conveyor means; a first actuating means for moving said goods-receiving means between a position for receiving goods discharged from said trays to a position where the goods are transferred from said goods-receiving means to said second conveyor means; a movable discharging member carried by each tray adjacent the trailing end thereof and adapted, when actuated, to sweep across the entire tray from adjacent said trailing end to adjacent the leading end to effect discharge of all goods carried on said tray; a second actuating means for engaging and moving said discharging member from adjacent the trailing end of the tray to adjacent the leading end of the tray, as the tray is moving, and effecting disengagement with said discharging member adjacent said leading end of the tray; and means synchronizing the movement of said goods-receiving means with the movement of said first conveyor means and with the movement of said second actuating means.

7. A conveyor system for moving goods through a baking oven comprising, in combination, a first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms horizontal; a loading station adjacent a portion of the path of said first conveyor means; a discharge station adjacent a portion of the path of said first conveyor means located before said loading station; said trays having leading and trailing ends as related to the direction of movement of said trays as they approach said discharge station; a second conveyor means for carrying away goods that are discharged from said first conveyor means; a substantially horizontally disposed goods-receiving means adapted to receive goods discharged from said trays and to transfer the discharged goods therefrom to said second conveyor means; a first actuating means for moving said goods-receiving means between a position for receiving goods discharged from said trays to a position where the goods are transferred from said goods-receiving means to said second conveyor means; a movable discharging member carried by each tray adjacent the trailing end thereof and adapted, when actuated, to sweep across the entire tray from adjacent said trailing end to adjacent the leading end to effect discharge of all goods carried on said tray; a second actuating means for engaging and moving said discharging member from adjacent the trailing end of the tray to adjacent the leading end of the tray, as the tray is moving, and effecting disengagement with said discharging member adjacent said leading end of the tray; means engaging said discharging member after said disengagement between said actuating means and said discharging member for effecting return of said discharging member from adjacent the leading end of the tray to adjacent the trailing end of the tray prior to said tray being moved to adjacent said loading station; and means synchronizing the movement of said goods-receiving means with the movement of said first conveyor means and with the movement of said second actuating means.

8. A conveyor system for moving goods through a baking oven comprising, in combination, a first conveyor means within the oven arranged to move over a closed continuous path; a plurality of trays having substantially horizontally disposed bottoms, for carrying goods thereon, moved by said first conveyor means along said closed continuous path in a manner to constantly maintain said tray bottoms substantially horizontal; there being a region along the path of said first conveyor means at which goods are discharged from said first conveyor means; means along said path of the conveyor means for aligning the bottom of each tray perfectly horizontal as the tray passes through said region in which goods are discharged therefrom; a second conveyor means for carrying away goods that are discharged from said first conveyor means; said second conveyor means being spaced laterally from said discharge region along the path of said first conveyor means, and said second conveyor means being located at a lower level than said discharge region; a substantially horizontally disposed platform means adapted to receive goods discharged horizontally from said trays and to transfer goods therefrom to said second conveyor means; actuating means for moving said platform between a position for receiving goods discharged horizontally from said trays to a position where the goods are transferred from said platform to said second conveyor means; discharge means for discharging the goods carried by said trays, while the trays are moving, in a direction parallel to the direction of movement of said trays; and means synchronizing the movement of said platform means with the movement of said first conveyor and with the movement of said discharge means.

9. A conveyor system for moving goods through a baking oven comprising, in combination, conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms horizontal, said trays having leading and trailing ends as related to the direction of movement of said trays as they approach said discharge region; means in said discharge region for receiving goods discharged from said trays; a movable discharging member carried by each tray adjacent the trailing end thereof and adapted, when actuated, to sweep across the entire tray from adjacent said trailing end to adjacent the leading end to effect discharge of all goods carried on said tray; and actuating means for engaging and moving the discharging member on each tray, from adjacent the trailing end of the tray to adjacent the leading end of the tray, when each tray is in said discharge region.

10. A conveyor system for moving goods through a baking oven comprising, in combination, conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms horizontal, said trays having leading and trailing ends as related to the direction of movement of said trays as they approach said discharge region; means in said discharge region for receiving goods discharged from said trays; a movable discharging member carried by each tray on the bottom thereof and adjacent the trailing end thereof and adapted, when actuated, to sweep across the entire bottom of the tray from adjacent said trailing end to adjacent the leading end to effect discharge of all goods carried on the bottom of said tray; and actuating means for engaging and moving the discharging member on each tray, from adjacent the trailing end of the tray to adjacent the leading end of the tray, when each tray is in said discharge region.

11. A conveyor system for moving goods through a baking oven comprising, in combination, conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms horizontal, said trays having leading and trailing ends as related to the direction of movement of said trays as they approach said discharge region; means in said discharge region for receiving goods discharged from said trays; a movable discharging member carried by each tray adjacent the trailing end thereof and adapted, when actuated, to sweep across the entire tray from adjacent said trailing end to adjacent the leading end to effect discharge of all goods carried on said tray; actuating means for engaging and moving the discharging member on each tray, from adjacent the trailing end of the tray to adjacent the leading end of the tray, when each tray is in said discharge region; and means engaging said discharging member for effecting return of said discharging member, from adjacent the leading end of the tray to adjacent the trailing end of the tray, after the tray has passed said discharge region.

12. A conveyor system for moving goods through a baking oven comprising, in combination, conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms substantially horizontal, said trays having leading and trailing ends as related to the direction of movement of said trays as they approach said discharge region; means in said discharge region for receiving goods discharged from said trays; a movable discharging member carried by each tray adjacent the trailing end thereof and adapted, when actuated, to sweep across the entire tray from adjacent said trailing end to adjacent the leading end to effect discharge of all goods carried on said tray; actuating means for engaging and moving the discharging member on each tray, from adjacent the trailing end of the tray to adjacent the leading end of the tray, when each tray is in said discharge region; and means along the path of the conveyor means for aligning the bottom of each tray perfectly horizontal as each tray passes through said discharge region.

13. A conveyor system for moving goods through a baking oven comprising, in combination, a constantly moving conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms horizontal, said trays having leading and trailing ends as related to the direction of movement of said trays as they approach said discharge region; means in said discharge region for receiving goods discharged from said trays; a movable discharging member carried by each tray adjacent the trailing end thereof and adapted, when actuated, to sweep across the entire tray from adjacent said trailing end to adjacent the leading end to effect discharge of all goods carried on said tray; and actuating means for engaging and moving the discharging member on each tray, from adjacent the trailing end of the tray to adjacent the leading end of the tray, while the tray is moving along said conveyor means and when each tray is in said discharge region.

14. A conveyor system for moving goods through a baking oven comprising, in combination, a constantly moving conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms horizontal, said trays having leading and trailing ends as related to the direction of movement of, said trays as they approach said discharge region; means in said discharge region for receiving goods discharged from said trays; a movable discharging member carried by each tray adjacent the trailing end thereof and adapted, when actuated, to sweep across the entire tray from adjacent said trailing end to adjacent the leading end to effect discharge of all goods carried on said tray; actuating means for engaging and moving the discharging member on each tray, from adjacent the trailing end of the tray to adjacent the leading end of the tray, while the tray is moving along said conveyor means and when each tray is in said discharge region; and means engaging said discharging member for effecting return of said discharging member, from adjacent the leading end of the tray to adjacent the trailing end of the tray, after the tray has passed said discharge region.

15. A conveyor system for moving goods through a baking oven comprising, in combination, a constantly moving conveyor means within the oven arranged to move over a closed continuous path, there being a discharge region along said path at which goods are discharged from said conveyor means; a plurality of trays having substantially horizontally disposed bottoms, for carrying goods thereon, moved by said first conveyor means along said closed continuous path in a manner to constantly maintain said tray bottoms horizontal, the trays having leading and trailing ends as related to the direction of movement of said trays as they approach said discharge region; a substantially horizontally disposed goods-receiving means in said discharge region for receiving goods discharged from said trays; a first actuating means for alternately moving said goods-receiving means between a loading position for receiving goods from said trays to an unloading position where the goods are removed from said goods-receiving means; a movable discharging member carried by each tray adjacent the trailing end thereof and adapted, when actuated, to sweep across the entire tray from adjacent said trailing end to adjacent the leading end to effect discharge of all goods carried on said tray; a second actuating means for engaging and moving the discharging member on each tray, from adjacent the trailing end of the tray to adjacent the leading end of the tray, as the tray is moving through said discharge region; and means synchronizing the movement of said first and second actuating means.

16. A conveyor system for moving goods through a baking oven comprising, in combination, conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms in a generally horizontal plane, said trays having leading and trailing ends as related to the direction of movement of said, trays as they approach said discharge region; discharge means for emptying each of said trays of the goods carried thereby, in the discharge region along the path of said conveyor means, by horizontally moving the goods carried by the tray, relative to the tray, past the leading end of the tray; a goods-receiving means for receiving goods discharged from said trays; oscillating means for moving said goods-receiving means between a loading position and a second position spaced from said loading position, said goods-receiving means in said loading position being positioned immediately adjacent the leading end of a tray that is being emptied by the discharge means, and across the path of movement of said tray, so as to receive thereon the goods discharged from said tray, and said goods-receiving means when in said second position being spaced away from and out of the path of movement of the emptied tray as the tray moves along the conveyor means past said discharge region; and means synchronizing the movement of said conveyor means, said discharge means, and said oscillating means.

17. A conveyor system for moving goods through a baking oven comprising, in combination, a constantly moving conveyor means within the oven arranged to move over a closed continuous path, there being a discharge region along said path at which goods are discharged from said conveyor means; a plurality of trays having substantially horizontally disposed bottoms, for carrying goods thereon, moved by said conveyor means along said closed continuous path in a manner to constantly maintain said tray bottoms in a generally horizontal plane, said trays having leading and trailing ends as related to the direction of movement of said trays as they approach said discharge region; discharge means for emptying each of said trays of the goods carried thereby, while the tray is moving along said conveyor means and when each tray is in said discharge region along the path of said conveyor means, by horizontally moving the goods carried by the tray, relative to the tray, past the leading end of the tray; a goods-receiving means for receiving goods discharged from said trays; oscillating means for moving said goods-receiving means between a loading position and a second position spaced from said loading position, said goods-receiving means when in said loading position being positioned immediately adjacent the leading end of a tray that is being emptied by the discharge means, and across the path of movement of said tray, so as to receive thereon the goods discharged from said tray, and said goods-receiving means when in said second position being spaced away from and out of the path of movement of the emptied tray as the tray moves along the conveyor means past said discharge region; and means synchonizing the movement of said constantly moving conveyor means, said discharge means, and said oscillating means.

References Cited in the file of this patent

UNITED STATES PATENTS

| | | |
|---|---|---|
| 1,858,732 | Farnham | May 17, 1932 |
| 2,244,430 | Parsons et al. | June 3, 1941 |
| 2,392,523 | Cramer | Jan. 8, 1946 |
| 2,501,473 | Malvicini | Mar. 21, 1950 |
| 2,608,287 | Mahoney | Aug. 26, 1952 |